L. W. STOCKWELL.
MACHINES FOR TAPPING GAS AND WATER-FITTINGS.

No. 173,191.

7 Sheets—Sheet 1.

Patented Feb. 8, 1876.

Witnesses
Sarah J. Fitch
Ann E. Stockwell

Inventor
Levi W. Stockwell
by Bradford Howland
his Attorney.

L. W. STOCKWELL.
MACHINES FOR TAPPING GAS AND WATER-FITTINGS.

No. 173,191. Patented Feb. 8, 1876.

7 Sheets—Sheet 3.

L. W. STOCKWELL.
MACHINES FOR TAPPING GAS AND WATER-FITTINGS.

No. 173,191. Patented Feb. 8, 1876.

Witnesses.
Sarah J. Fitch
Ann E. Stockwell

Inventor
Levi W. Stockwell
by Bradford Howland
his Attorney.

7 Sheets—Sheet 4.

L. W. STOCKWELL.
MACHINES FOR TAPPING GAS AND WATER-FITTINGS.

No. 173,191. Patented Feb. 8, 1876.

Witnesses
Sarah J. Fitch
Ann E. Stockwell

Inventor
Levi W. Stockwell
by Bradford Howland
his Attorney.

7 Sheets—Sheet 5.

L. W. STOCKWELL.
MACHINES FOR TAPPING GAS AND WATER-FITTINGS.

No. 173,191. Patented Feb. 8, 1876.

Witnesses
Sarah J. Fitch
Ann E. Stockwell

Inventor
Levi W. Stockwell
by Bradford Howland
his Attorney.

N. PETERS, PHOTO-LITHOGRAPHER, WASHINGTON, D. C.

L. W. STOCKWELL.
MACHINES FOR TAPPING GAS AND WATER-FITTINGS.

No. 173,191.

7 Sheets—Sheet 6.

Patented Feb. 8, 1876.

Witnesses
Sarah J. Fitch
Ann E. Stockwell

Inventor
Levi W. Stockwell
by Bradford Howland
his Attorney.

7 Sheets—Sheet 7.
L. W. STOCKWELL.
MACHINES FOR TAPPING GAS AND WATER-FITTINGS.
No. 173,191. Patented Feb. 8, 1876.
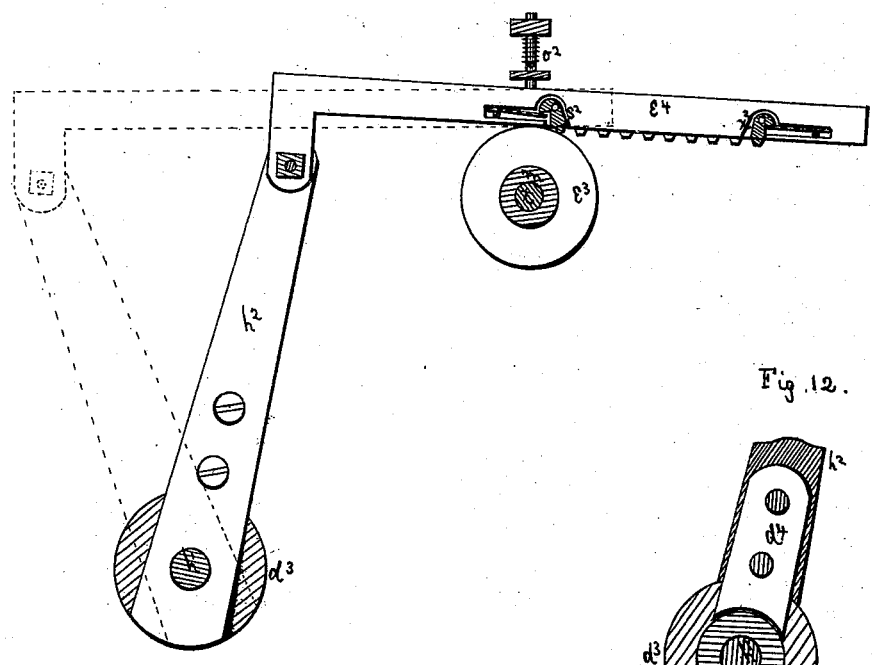
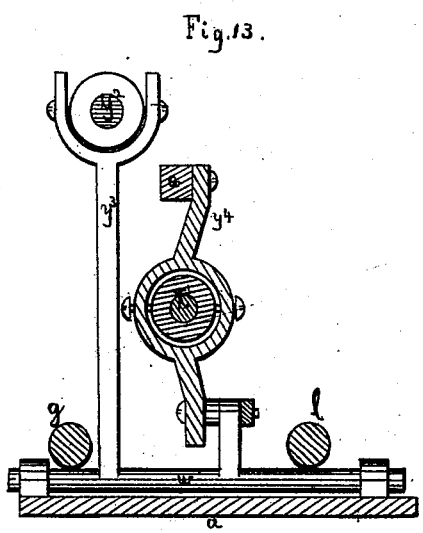

UNITED STATES PATENT OFFICE.

LEVI W. STOCKWELL, OF RAVENNA, OHIO.

IMPROVEMENT IN MACHINES FOR TAPPING GAS AND WATER FITTINGS.

Specification forming part of Letters Patent No. 173,191, dated February 8, 1876; application filed July 31, 1875.

*To all whom it may concern:*

Be it known that I, LEVI W. STOCKWELL, of Ravenna, Portage county, Ohio, have invented certain Improvements in Gas-Fitting Machines, of which the following is a specification:

The object of this invention is to tap gas-fittings by operating several taps at the same time on a fitting, the fittings being held in position by a series of chucks on a carrier having a reciprocating movement.

The seven sheets of drawings hereto annexed form a part of this specification.

Figure 1:
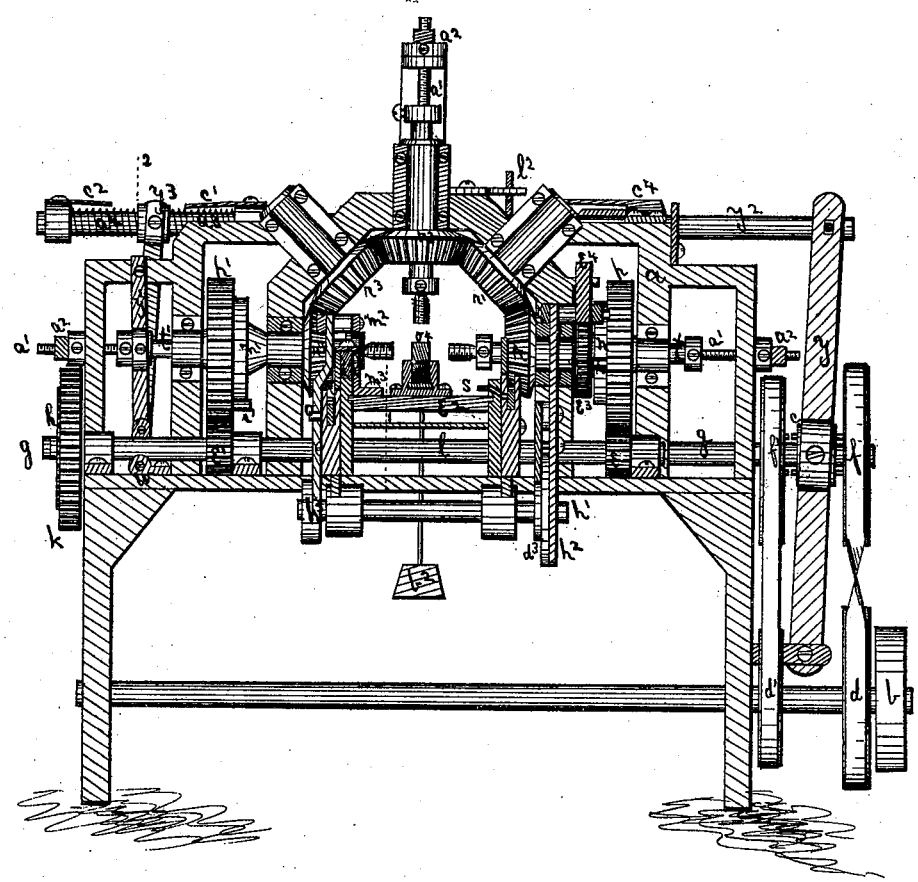
Figure 2:
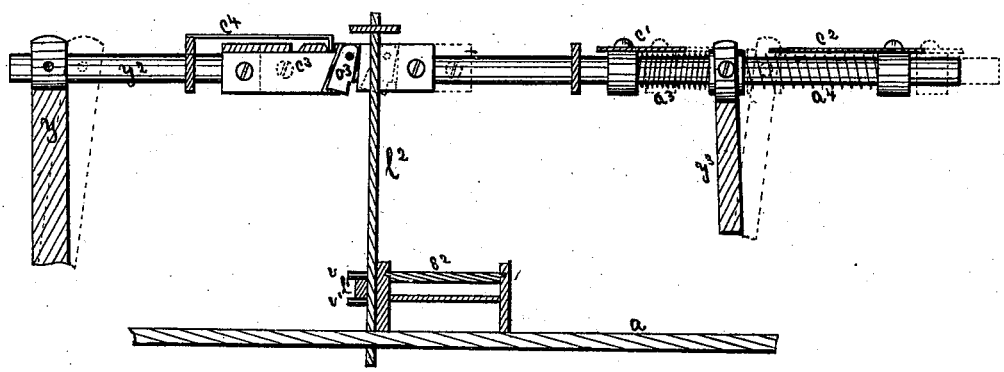
Figure 3:
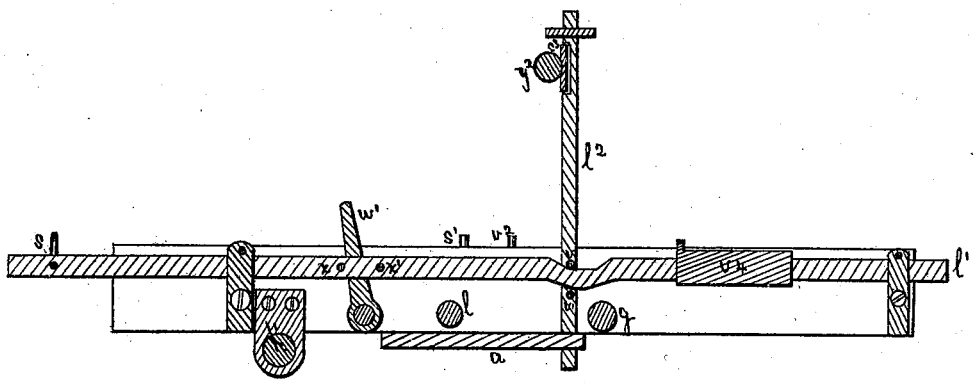
Figure 4:
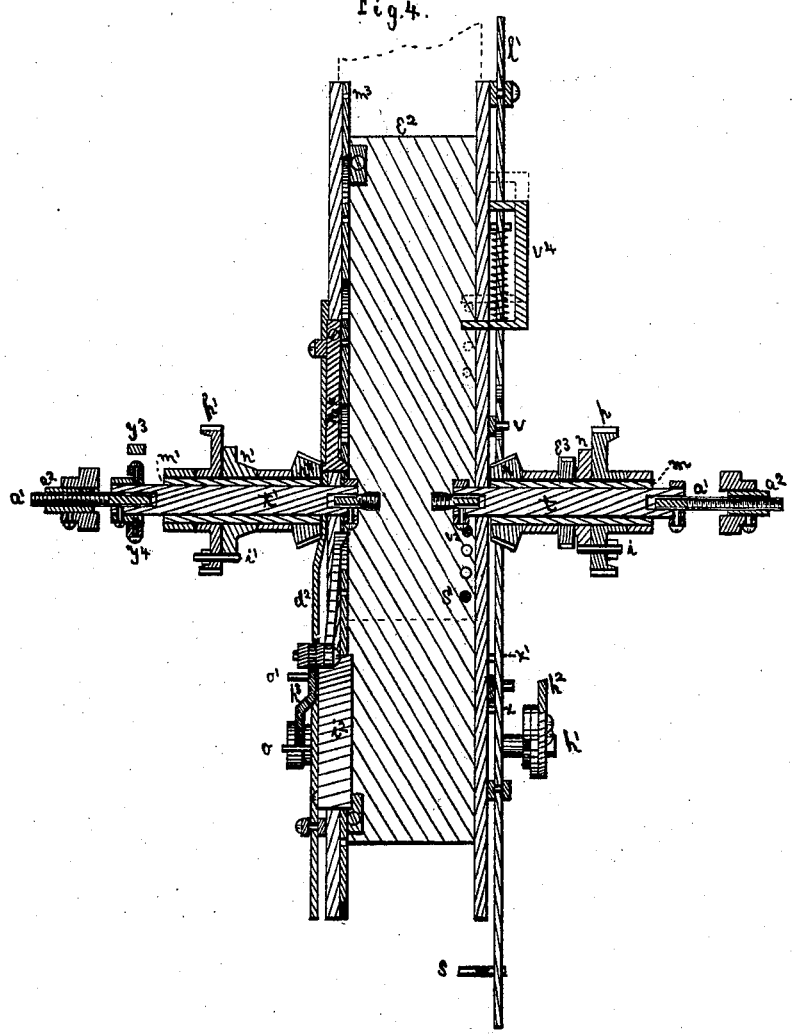
Figure 5:
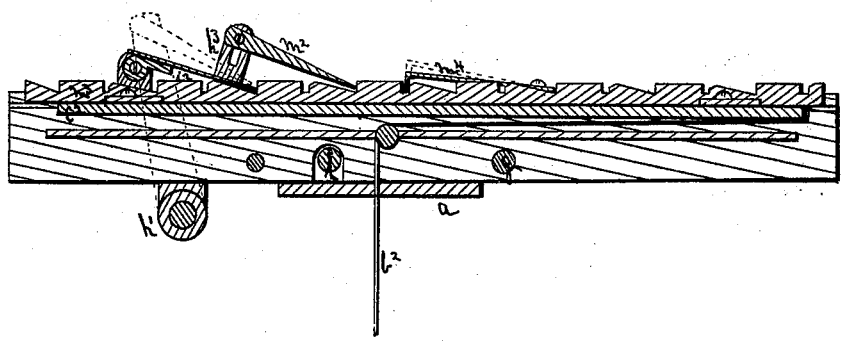
Figure 6:
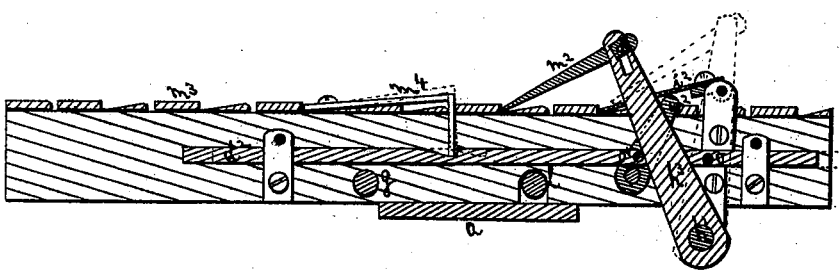
Figure 7:
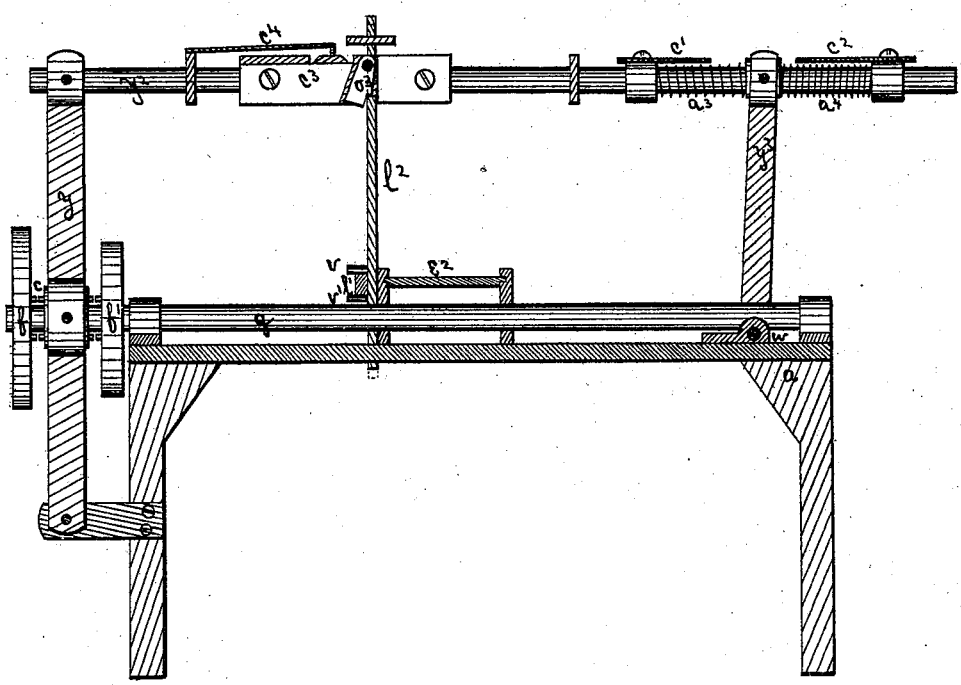
Figure 8:
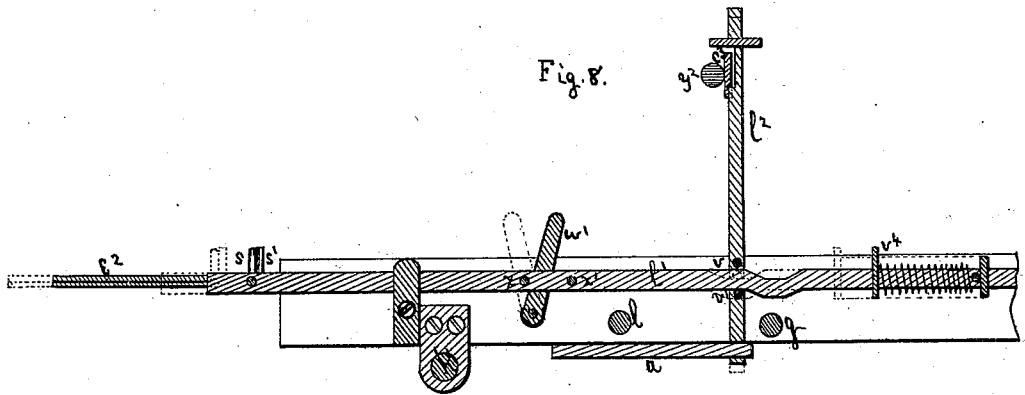
Figure 9:
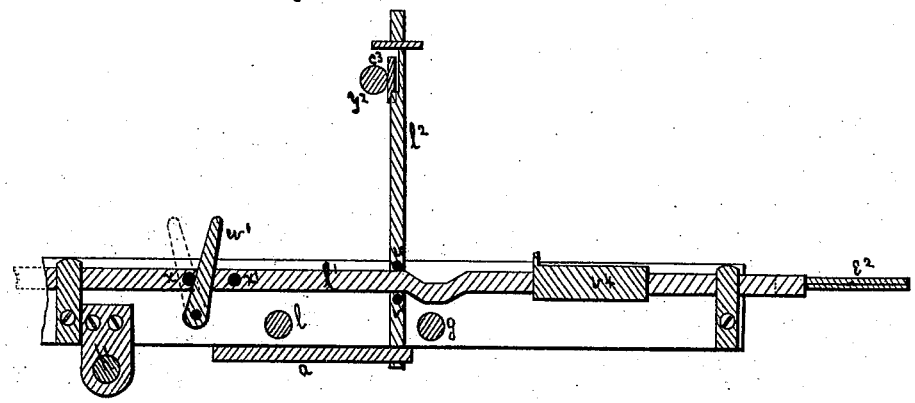
Figure 10:
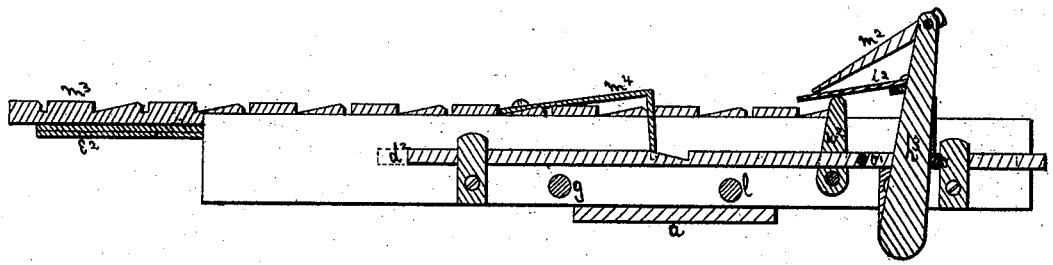

Figure 1 is a front view of the machine. Fig. 2 is a back view of parts of the machine. Fig. 3 is a view of the right-hand side of the carrier-frame. Fig. 4 is a horizontal sectional view of the machine. Fig. 5 is a right-hand sectional view of the carrier at the dotted line 1 in Fig. 1. Fig. 6 is a view of the left-hand side of the carrier-frame. Fig. 7 is a back view of the sliding rod $y^2$, and parts connected with it. Figs. 8 and 9 are views of the right-hand side of the carrier-frame and carrier. Fig. 10 is a view of the left-hand side of the carrier-frame and carrier. Figs. 11 and 12 are views of parts of the machine. Fig. 13 is a vertical cross-section at the dotted line 2 in Fig. 1.

$a$ is the frame of the machine. $b$ is the driving-pulley, which revolves the pulleys $d\ d^1$. The pulleys $d\ d^1$ are connected by belts with the pulleys $f f^1$, which are loose on the shaft $g$. One of the connecting-belts is a cross-belt. The clutch $c$ slides on a feather on the shaft $g$, and is alternately thrown in clutch with the pulley $f$ and the pulley $f^1$. By means of one of the belts being crossed the motion of shaft $g$ is reversed by throwing one of the pulleys $f f^1$ out of clutch and the other in clutch. The pinion $h$ on shaft $g$ drives the wheel $k$ and pinions $e\ e^1$ on the shaft $l$. The pinions $e\ e^1$ drive the wheels $p\ p^1$, which are loose on the hollow shafts $m$ and $m^1$, Fig. 4, but may be attached to the wheels $n$ and $n^1$ on the shafts $m$ and $m^1$, by moving the pins $i\ i^1$ (which are in slots in the wheels $p\ p^1$) into notches in the circumference of the wheels $n\ n^1$, where they are secured by nuts.

The hollow shafts $m\ m^1$ revolve the spindles $t\ t^1$ by means of a feather, so as to allow the spindles a reciprocating motion, and thus cause the tap in the end of each spindle to enter and withdraw from the fitting.

When in operation only one of the loose wheels $p\ p^1$ is attached to the wheels $n\ n^1$, because the motion of either of the shafts $m\ m^1$ is transmitted to the other by the connecting-wheels $r\ r^1\ r^2\ r^3\ r^4$.

As shown in the drawings, the wheel $p$ is connected, by its pin $i$, with the wheel $n$, and the wheel $p^1$ turns loose on its shaft; but when it is desired to cut left-hand threads wheel $p^1$ is connected with wheel $n^1$, and wheel $p$ is allowed to turn on its shaft. Both right and left hand threads may be cut at the same time by connecting wheels $p$ and $n$, and also $p^1$ and $n^1$, and removing one of the wheels $r^1$ $r^2\ r^3$.

The shaft of wheel $r^2$ is hollow, and revolves a spindle in the same manner as the shafts $m$ $m^1$, and is used in tapping T-fittings. It is at right angles to the shafts $m\ m^1$, which are in line with each other. In the outer ends of the spindles the screws $a^1$ are fastened by a set-screw. These screws $a^1\ a^1\ a^1$ are in line with the spindles, and turn in stationary threaded nuts $a^2$, held in the frame by set-screws, which causes the taps in the other ends of the spindles to enter and withdraw from the fittings.

The pulleys $f\ f^1$ are alternately thrown in clutch by means of the lever $y$, pivoted at its lower end to the frame, and at its upper end to the sliding rod $y^2$. A pin in the lever $y$, near its center, enters a groove in the circumference of the clutch $c$, by means of which the clutch is moved on its shaft.

The upper end of the arm $y^3$ of the rock-shaft $w$ is pivoted to a sliding collar on the rod $y^2$. This rock-shaft is moved by the lever $y^4$, which is pivoted at its lower end to a short arm of the rock-shaft $w$, and at its upper end to the frame. A pin in the lever $y^4$, near its center, enters a groove around the spindle $t^1$. Around the rod $y^2$, on each side of the sliding collar, to which the arm $y^3$ is pivoted, are spiral springs $a^3\ a^4$. These springs are adjustable by means of collars fastened to the rod $y^2$ by set-screws, and to these collars are attached the adjustable stops $c^1\ c^2$. The rod $y^2$ passes through, and is supported by, projections on the frame. The plate $c^3$, Fig. 2, is attached to the rod $y^2$, and has two notches in its upper edge for the spring-stop $c^4$ to enter. This stop is attached to the frame. The spring-stop $c^4$ presses down in each of these two notches alternately, as the sliding rod $y^2$ is moved, to throw the pulleys $f f^1$ in clutch. The two adjacent sides of the notches are sloping, so that the spring-stop $c^4$ will prevent the rod $y^2$ from sliding, while the arm $y^3$, by its movement, compresses one of the spiral springs until the collar of the arm $y^3$ presses against one of the stops $c^1 c^2$, and then the sloping side of the notch lifts the spring-stop $c^4$ out of the notch, and the force of the compressed spiral spring slides the rod $y^2$, which throws the clutch $c$ from one pulley to the other, and allows the spring-stop $c^4$ to enter the other notch. The chuck-carrier $e^2$ slides in its frame across the machine jest beneath the taps. A series of chucks, $o^4$, to hold fittings, are fastened in line lengthwise of the chuck-carrier.

As soon as the taps have threaded and withdrawn from a fitting, the chuck-carrier $e^2$ slides forward in its frame far enough to bring another chuck in position for threading the fitting held by it. The chuck-carrier is operated by means of the toothed wheel $e^3$ on the shaft $m$, the rack $e^4$, the rock-shaft $h^1$, with its arms $h^2 h^3$, the pawl $m^2$, rack $m^3$, pawls $i^2$ and $m^4$, and bar $d^2$. The rack $e^4$ is pivoted to the arm $h^2$ of the rock-shaft $h^1$. The pawl $m^2$ is pivoted to the arm $h^3$. The rack $m^3$ is fastened to the carrier $e^2$, on which it is adjustable. The wheel $e^3$ gives a reciprocating motion to the rack $e^4$ and rock-shaft $h^1$, causing the pawl $m^2$ to move the rack $m^3$ and carrier $e^2$. The weight $b^2$ is attached to a cord which passes over a pulley in the frame beneath the taps—the other end of the cord being fastened to the forward end of carrier $e^2$. The pawls $i^2$ and $m^4$ prevent the weight from drawing back the carrier and hold the carrier firmly in position while the fitting is being threaded.

When the rock-shaft $h^1$ moves backward, carrying the arm $h^3$ and pawl $m^2$, the arm presses against the pin $o$ in the bar $d^2$, Fig. 10, which slides back the bar, and, by means of a slight cam on the bar, lifts the ratchet $m^4$ out of the rack $m^3$, so as to permit the carrier $e^2$ to be moved forward. When the pawl $m^2$ is sliding the carrier forward the arm $h^3$ presses against the pin $o^1$ in the bar $d^2$ and slides forward the bar so as to permit the pawl $m^4$ to fall in the rack when the carrier has reached the proper position for the fitting to be tapped, Fig. 6.

The arm $h^2$ is made self-adjustable on the rock-shaft $h^1$ by being clamped to the wheel $d^3$ on the rock-shaft by means of the plate $d^4$, Fig. 12, and screws passing through the plate and arm.

The two end cogs $s^2 x^2$ of the rack $e^4$ are slip-cogs, being pivoted to the rack and each held by a slight spring, so that when the rack has been carried over wheel $e^3$ the last cog will slip over the teeth of the wheel until the motion of the wheel is reversed, when it will be connected, by the action of its spring, with the wheel-teeth, so as to again move the rack. The spiral spring $o^2$ on a sliding pin in the frame, directly over wheel $e^3$, presses the rack down on the wheel, and, by the friction of the wheel on the rack, assists in connecting the teeth of the wheel and rack.

When the taps begin to approach each other, the pawl $m^2$ begins to slide the chuck-carrier forward, and the fitting is moved into position to be tapped in time for the approaching taps to enter it. The rack $e^4$ and pawl $m^2$ then remain stationary until the fitting is tapped and the motion of the taps is reversed to withdraw, when the rack $e^4$ and pawl are moved back, where they remain until again moved forward by a reverse of the motion of the taps.

The sliding bar $l^1$, Figs. 7 and 8, moves in ways on the right-hand side of the carrier-frame. By sliding forward this bar the cam on it presses against the pin $v$ in the vertical stop $l^2$ and lifts the stop $l^2$, causing it to enter a notch in the lower edge of the plate $c^3$ when the sliding rod $y^2$ is moving, and thus stopping the rod $y^2$ when the clutch $c$ is equally distant from each of the pulleys $f f^1$, and in clutch with neither of them. The machine then ceases to operate until the bar $l^1$ is moved back and the pin $v^1$ forces the stop $l^2$ out of the notch in plate $c^3$ by the pressure of the cam of bar $l^1$.

The purpose and manner of thus stopping the motion of the taps are as follows: When the last fitting on the carrier $e^2$ is being moved forward by the pawl $m^2$ in position to be tapped, the pin $v^2$ in the carrier presses back the slide $v^4$ on the bar $l^1$, compressing the spiral spring on the bar $l^1$. The bar is prevented from sliding by the cam on the bar coming in contact with the pin $v$ in the stop $l^2$, which is prevented from sliding up by the under edge of the plate $c^3$. These positions of the carrier $e^2$ and slide $v^4$ are indicated by the dotted lines in Fig. 4. The part of the stop $l^2$ which presses against the lower edge of plate $c^3$ is shown in Fig. 3.

While the fitting is being tapped the arm $y^3$ is compressing the spring $a^3$, and when the fitting is tapped, arm $y^3$ presses against the stop $c^1$ and forces the spring-stop $c^4$ out of its notch, and the power of the compressed spring $a^3$ slides the rod $y^2$ into the position shown in Fig. 2, causing the taps to withdraw. While the rod $y^2$ is sliding into this position the pressure of the cam of bar $l^1$ is prevented from forcing the stop $l^2$ into the notch in the lower edge of plate $c^3$ by the strut $o^3$ pivoted to the plate $c^3$. While the taps are withdrawing from the fitting, the spring $a^4$ is being compressed, and after the taps have left the fitting, and while continuing to withdraw, the arm $y^3$ presses against the stop $c^2$, sliding the rod $y^2$ till the cam on the bar $l^1$ forces the stop $l^2$ into the notch in the lower edge of plate $c^3$. When stop $l^2$ is entering this notch, the bar $l^1$ slides forward by the action of the spring on the bar which has been compressed by the pin $v^2$ on the carrier, forcing back the slide $v^4$.

By the sliding forward of bar $l^1$ the arms $w^1$ $w^2$ on a rock-shaft passing through the carrier-frame have been moved forward by the pin $x$ in the bar $l^1$. These positions of the various parts described are shown in Figs. 9 and 10. The arm $w^2$ in moving forward lifts the pawl $i^2$ and the pawl $m^2$, which rest on the ratchet, out of the rack $m^3$, and now the weight $b^2$ draws back the carrier $e^2$ to the position shown in Fig. 8, when the pin $s^1$ in the carrier, pressing against the pin $s$ in the bar $l^1$, forces back the bar to its original position, shown by the dotted lines. By this last movement of bar $l^1$ the pin $x^1$ moved back the arms $w^1$ $w^2$, causing the pawl $i^2$ and pawl $m^2$ to drop into rack $m^3$; at the same time the cam on bar $l^1$ lowered the stop $l^2$ out of the notch in plate $c^3$, and the compressed spring $a^4$ moved the rod $y^2$, putting the pulley $f^1$ in clutch and causing the taps to approach the fitting at the forward end of the carrier.

If desired, the weight $b^2$ and cord may be removed, and then after the taps are withdrawn from the last fitting on the carrier, the taps will cease to move until the carrier is moved back by hand.

The tapped fittings may be removed and the chucks refilled with fittings while the machine is in operation.

I claim as my invention—

1. The chuck-carrier $e^2$, in combination with the rack $m^3$, pawl $m^2$, arms $h^2$ and $h^3$, rack $e^4$, and wheel $e^3$, substantially as and for the purpose herein set forth.

2. The spindle $t$, in combination with the lever $y^4$, sliding-rod $y^2$, with its notched plate $c^3$, spring $c^4$, spiral springs $a^3$ $a^4$, stops $c^1$ $c^2$, and the lever $y$, substantially as and for the purpose herein set forth.

3. The combination of the chuck-carrier $e^2$ with the rack $m^3$ and pawl $i^2$, substantially as and for the purpose herein set forth.

4. The combination of the chuck-carrier $e^2$, pawl $m^4$, bar $d^2$, and arm $h^3$, substantially as and for the purpose herein set forth.

5. The rack $e^4$, having the slip-cogs $s^2$ $x^2$, in combination with wheel $e^3$, substantially as and for the purpose herein set forth.

6. The combination of the spring $o^2$, rack $e^4$, wheel $e^3$, substantially as and for the purpose herein set forth.

7. The arm $h^2$, in combination with the plate $d^4$, wheel $d^3$, and rock-shaft $h^1$, substantially as and for the purpose herein set forth.

8. The combination of the strut $o^3$, plate $c^3$, and stop $l^2$, substantially as and for the purpose herein set forth.

9. The sliding bar $l^1$, in combination with the slide $v^4$, chuck-carrier $e^2$, stop $l^2$, and plate $c^3$, substantially as and for the purpose herein set forth.

10. The combination of the chuck-carrier $e^2$, sliding bar $l^1$, arms $w^1$ $w^2$, pawl $i^2$, and rack $m^3$, substantially as and for the purpose herein set forth.

11. The combination of the pawl $m^2$, pawl $i^2$, rack $m^3$, carrier $e^2$, pawl $m^4$, bar $d^2$, arm $h^3$, arm $w^2$, and bar $l^1$, substantially as and for the purpose herein set forth.

12. The combination of the chuck-carrier $e^2$ and sliding bar $l^1$, having respectively the pins $s$ and $s^1$, with stop $l^2$ and sliding bar $y^2$, substantially as and for the purpose herein set forth.

13. The combination of the spindle $t$, wheel $e^3$, rack $e^4$, and rock-shaft $h^1$, pawl $m^2$, rack $m^3$, and chuck-carrier $e^2$, substantially as and for the purpose herein set forth.

14. The combination of the spindle $t^1$, screw $a^1$, nut $a^2$, lever $y^4$, rock-shaft $w$, arm $y^3$, springs $a^3$ $a^4$, stops $c^1$ $c^2$, sliding rod $y^2$, lever $y$, clutch $c$, and pulleys $f$ $f^1$, substantially as and for the purpose herein set forth.

LEVI W. STOCKWELL.

Witnesses:
   BRADFORD HOWLAND,
   E. P. WILMOT.